(12) United States Patent
Wang

(10) Patent No.: US 6,580,420 B1
(45) Date of Patent: Jun. 17, 2003

(54) CONVERTIBLE COMPUTER INPUT DEVICE

(76) Inventor: Yanqing Wang, 12436 Edge Street, Maple Ridge, British Columbia (CA), V2X 0B3

( * ) Notice: Subject to any disclaimer, the term of this patent is extended or adjusted under 35 U.S.C. 154(b) by 0 days.

(21) Appl. No.: 09/526,428

(22) Filed: Mar. 15, 2000

(51) Int. Cl.[7] .................................................. G09G 5/08
(52) U.S. Cl. ....................... 345/163; 345/157; 345/164; 345/167
(58) Field of Search ................................ 345/157, 158, 345/161, 162, 163, 164, 167, 156

(56) References Cited

U.S. PATENT DOCUMENTS

| | | | | | |
|---|---|---|---|---|---|
| 5,049,863 | A | * | 9/1991 | Oka | 345/163 |
| 5,063,289 | A | * | 11/1991 | Jasinski et al. | 345/163 |
| 5,726,684 | A | * | 3/1998 | Blankenship et al. | 345/167 |
| 5,949,401 | A | * | 9/1999 | Kazarian | 345/167 |

FOREIGN PATENT DOCUMENTS

| | | | | | |
|---|---|---|---|---|---|
| JP | | 08123617 | * | 5/1996 | G06F/3/033 |

* cited by examiner

*Primary Examiner*—Steven Saras
*Assistant Examiner*—Michael J Moyer
(74) *Attorney, Agent, or Firm*—Oyen Wiggs Green & Mutala

(57) ABSTRACT

A computer input device has function buttons which can be moved relative to a position sensor. The device can be used as a mouse. In specific embodiments of the device the position sensor includes a rotatable ball and the device can be operated either as a mouse or as a trackball. Such embodiments have a ball-carrying member which is movably connected to a member which carries one or more function buttons. When configured for mouse operation the ball-carrying member underlies the member which carries the function buttons and a ball on the ball-carrying member frictionally engages a surface under the input device. When configured for operation as a trackball the ball is offset relative to the function buttons so that the ball can be comfortably operated by a user's thumb. The device can be shaped to fit a user's hand ergonomically in both mouse mode and trackball modes. A user can reduce the risk of injury caused by repetitive motions by periodically switching between mouse operation and trackball operation. Some embodiments have a storage configuration in which the position sensor is held in a protected location. Some embodiments are adjustable to accommodate different hand sizes. In some embodiments a member carrying the function button can be separated from a member carrying the position sensor to permit two-handed operation.

30 Claims, 11 Drawing Sheets

CONVERTIBLE COMPUTER INPUT DEVICE

FIELD OF THE INVENTION

This invention relates to computer input devices. Particular embodiments provide pointing devices which can be used both as a mouse and as a trackball.

BACKGROUND OF THE INVENTION

Various known pointing devices allow a user to provide two-dimensional coordinate information to a computer. One such device is a mouse. A typical mouse has a spherical ball mounted in a housing. The ball projects slightly from a bottom side of the housing. A user can cause the ball to rotate by sliding the mouse over a flat surface. Sensors in the mouse sense rotation of the spherical ball about two orthogonal axes. Signals output by the sensors are delivered to a computer. The signals may be interpreted by software in the computer to determine a location of a cursor in two dimensions on a display of the computer. One or more function buttons are provided on the housing in position(s) where they can be easily actuated by a user grasping the mouse. By pushing the buttons a user can generate additional signals to be sent to the computer.

Mice are very popular because they provide users with an intuitive way to provide input to a computer. A mouse can provide fine control over cursor position in two dimensions. Some mice are equipped with wheels. The wheels are located on an upper surface of the mouse. A user can use a wheel equipped mouse (together with suitable software drivers) for scrolling through lists of items. One disadvantage of a mouse is that a mouse requires the availability of a flat surface for proper operation. This can be a problem, for example, when a mouse is used as a pointing device for a portable laptop computer and the computer is being used in a location where there is no convenient flat surface.

An alternative type of pointing device is a trackball. A trackball has a spherical ball mounted in and projecting upwardly from a housing. A user can roll the spherical ball by directly manipulating it. Trackballs have the advantages that they do not require a large flat surface for proper operation and the location of a trackball does not change as the trackball is used.

Over the past number of years considerable research has been conducted into the ergonomics of computer input devices. These enquiries have been prompted by the discovery that people who use computers for long periods of time can suffer various injuries including so-called "repetitive strain injuries". Repetitive strain injuries can occur when users repetitively make thousands of very similar motions of the same muscles over a long period. Furthermore, even if a user does not suffer physical injury, the user can become fatigued after using a mouse or trackball to control a computer for extended periods. This can lead to reduced productivity.

The combinations of hand and arm muscles used to control a mouse are different from the combination of hand and finger muscles used to control a trackball. A computer user may reduce the risk of repetitive strain injuries and also reduce fatigue by periodically switching between a mouse and a trackball. When using a mouse the muscles used to control a trackball can rest and vice versa.

Various designs have been proposed for computer pointing devices which can be operated selectively either as mice or as trackballs. All of these prior devices have significant disadvantages. Jasinski et al., U.S. Pat. No. 5,063,289 discloses a combined mouse and trackball. The grip portion of the device, which is gripped when the device is being used as a mouse, serves as a base when the device is being used as a trackball. The grip portion cannot therefore be ergonomically shaped. Further, the Janiski et al. design requires two separate sets of function buttons. When the Janiski et al. device is used as a trackball the function buttons are not ergonomically positioned. The way in which the device converts to a mouse prevents a more optimum location for the trackball function buttons. Overall, this design forces the user to adopt an awkward hand posture to operate the device.

Blankenship et al., U.S. Pat. No. 5,726,684 shows another combination mouse and trackball device. The Blankenship device can be built into the keyboard of a laptop computer. The device can be used in place as a trackball. The device can be removed from the keyboard and turned upside down for use as a mouse. The Blankenship design also requires two different sets of function buttons and has the further disadvantages that the grip portion of the device is not ergonomically shaped. Further, the trackball function buttons are not optimally located.

Kwok, U.S. Pat. No. 5,280,726 shows a combination mouse and trackball. The ball can be moved between a lower position wherein the device functions as a mouse and an upper position wherein the ball can be manipulated as a trackball by an elevator mechanism. The Kwok device has the disadvantage that the buttons are located in a position which is convenient when the device is being used as a mouse but is awkward when the device is being used as a trackball.

Hovey et al., U.S. Pat. No. 4,562,347 shows another combination mouse and trackball device. The Hovey et al. device has a large ball which projects from both upper and lower faces of a housing. Because the ball projects upwardly from the housing, a user's hand could unintentionally interfere with rotation of the ball when the device is being used as a mouse. To use the device as a trackball a user must support the housing so that the ball is clear of any surfaces and can freely rotate. Furthermore, when this device is used as a trackball, the function buttons are located in positions which require a user to adopt an awkward hand posture when using the device.

Grant, U.S. design Pat. Nos. D361,991 and D346,373, both entitled "Combined Trackball and Mouse" show devices in which a trackball projects from a front surface of a housing and a mouse ball projects from a lower surface of the housing. It appears that the same ball serves as both as a mouse ball and a trackball.

There is a need for a computer pointing device which can be operated both as a mouse which has the ease of operation of a well designed mouse and as a trackball which has the ease of operation of a well designed trackball. There is a particular need for such a device which provides a mouse having an ergonomically shaped grip. There is also a particular need for computer input devices which can be adjusted to comfortably accommodate hands of different sizes. Especially in mobile computing there is a need for computer input devices which can be configured in a way which protects position sensors, such as balls, and other sensitive movable parts, from dirt and physical damage while they are not being used. In some computing environments, there is also a need for input devices which can be configured to allow a user to operate the devices with two hands.

SUMMARY OF THE INVENTION

This invention provides computer input devices which can function as computer mice. A mouse has a position sensor, which typically comprises a rolling ball. When an operator moves the mouse relative to a flat surface the position sensor generates signals which can be used by a host computer. The host computer may, for example, use the signals to position a cursor on a screen. A mouse also has one or more function buttons which a user can press to send control signals to a host computer. The input devices of the invention have function buttons and position sensors which can be moved relative to one another. In various embodiments this permits an input device according to the invention to be used selectively as a mouse or as a trackball;
be adjusted to fit different hand sizes;
be placed in a "storage" configuration wherein the position sensor is protected from damage and dirt; or,
be used for two-handed input control, with the function button located for convenient operation by one hand of a user and the position sensor operable by the other hand of the user.

Accordingly, one aspect of the invention provides a computer input device comprising a function-button-carrying member; at least one function button on the function-button-carrying member; a position sensor-carrying member which is moveably coupled to the function-button-carrying member; and, a position sensor on the position sensor-carrying member. When the position sensor-carrying member is in a first position relative to the function-button-carrying member, the input device is operable as a mouse.

In various specific embodiments of the invention the ball-carrying member is connected in different ways to the function-button-carrying member to allow the ball-carrying member to be moved between its two positions. In one embodiment of the invention the ball-carrying member is slidably coupled to the function-button-carrying member. In another embodiment of the invention the ball-carrying member is pivotally coupled to the function-button-carrying member. The ball-carrying member may be pivotally coupled to the function button-carrying member for relative movement about a generally vertical axis or about a generally horizontal axis.

In one preferred embodiment, the position sensor comprises a rotatable ball and, when the position sensor-carrying member is in a second position relative to the function-button-carrying member, an upper surface of the ball is exposed so that the input device is usable as a trackball. Preferably, with the position sensor-carrying member in the second position the user can rest the palm of one hand on a surface of the function-button-carrying member, operate the function button with the forefinger of the hand, and roll the rotatable ball with the thumb of the hand.

In another preferred embodiment, when the position sensor-carrying member is in a storage position relative to the function-button-carrying member, the position sensor is enclosed and protected by the position sensor-carrying member and the function-button-carrying member. This is particularly useful in mobile computing.

In yet another preferred embodiment a dimension of a hand-grippable portion of the input device, or a distance between the position sensor and other parts of the device is adjustable by moving the position sensor-carrying member relative to the function-button-carrying member. This permits the computer input device to be adapted for use by hands of different sizes.

In still another preferred embodiment, the position sensor-carrying member can be moved into a position relative to the function-button-carrying member wherein a user can operate the function button with one hand and can operate the position sensor with another hand. This permits the user to use the computer input device for two handed input control.

A second aspect of the invention provides computer input device which is selectively operable as a mouse or as a trackball. The input device comprises a function-button-carrying member; at least one function button on a face of the function-button-carrying member; a position sensor-carrying member moveably coupled to the function-button-carrying member; and, a position sensor on the position sensor-carrying member and moveable therewith relative to the function-button-carrying member. The position sensor-carrying member has a first position, wherein the position sensor is located beneath the face of the function-button-carrying member and the position sensor is oriented to detect relative motion between the input device and a surface beneath the input device so that the input device is usable as a mouse. The position sensor-carrying member is movable from the first position to a second position, wherein the position sensor-carrying member is displaced relative to the function button-carrying member and the position sensor is oriented to detect relative motion between the position sensor and a user's hand.

In a preferred embodiment, the position sensor comprises a ball supported for rotation on the position sensor-carrying member and a sensor associated with the ball. The sensor generates a signal describing rotation of the ball. When the position sensor carrying member is in its first position, the ball can be frictionally engaged with a surface under the input device and when the position sensor carrying member is in its second position the ball can be manually rotated to permit the input device to be used as a trackball. The position sensor-carrying member is slidably coupled to the function-button-carrying member in some particular embodiments and is pivotally coupled to the function-button-carrying member in other particular embodiments.

Another aspect of the invention provides a computer input device comprising: a function-button-carrying member; at least one function button on a face of the function-button-carrying member; a position sensor-carrying member detachably coupled to the function-button-carrying member; and, a position sensor on the position sensor-carrying member. The position sensor-carrying member may be coupled to the function-button-carrying member in a first position in which the position sensor is positioned beneath the function button-carrying member where it can detect motion of the input device relative to a surface beneath the input device to permit the input device to be used as a mouse. When the position sensor-carrying member is separated from the function button-carrying member the position sensor carrying member can be located a sufficient distance from the function-button carrying member to permit two-handed operation of the input device.

A still further aspect of the invention provides a computer input device comprising a position sensor-carrying member; a position sensor on the position sensor-carrying member and function-button-carrying member. The function-button-carrying member is configured to receive the position sensor carrying member in each of: a first position wherein the position sensor is exposed and the device is usable as a mouse; and, a second position wherein the position sensor is enclosed by the position sensor-carrying member and the function-button-carrying member.

Further features and advantages of the invention are set out below.

BRIEF DESCRIPTION OF THE DRAWINGS

In drawings which illustrate non-limiting embodiments of the invention.

DETAILED DESCRIPTION

This invention provides convertible computer input devices which can be configured for operation in various modes, such as a mouse mode or a trackball mode. Switching among the various modes is accomplished by moving a member which carries a ball (a "ball-carrying member" or, more generally, a "position sensor-carrying member") relative to a member carrying one or more function buttons (a "function-button-carrying member"). The function buttons may comprise pressure switches, contact switches or other finger-operable controls. In a first configuration the ball projects from a lower surface of the input device and the function buttons are on the top surface of the input device. The input device can be used as a mouse in the first configuration. In the second configuration the ball projects upwardly at a location where it can be rotated by a user's thumb while the user's other fingers are readily able to manipulate the function buttons. The input device can be used as a trackball in the second configuration.

In a first embodiment of the invention a ball-carrying member is slidably received within a housing which serves as a function-button-carrying member. When the ball-carrying member is extended from the housing, a ball on the ball-carrying member can be manipulated as a trackball. When the ball-carrying member is slid into the housing the ball projects below the housing so that the input device can be used as a mouse. It is generally desirable that the function-button-carrying members should enclose the upper part of ball when the device is in its first configuration. This prevents dust and dirt from falling onto the ball when the device is being used as a mouse. However, this is not absolutely necessary. The function button-carrying member could have apertures in it as long as, when the device is being used as a mouse, the user's hand is supported in a position where it does not interfere with the rolling of the ball as the user moves the device on a surface.

Figure 1:
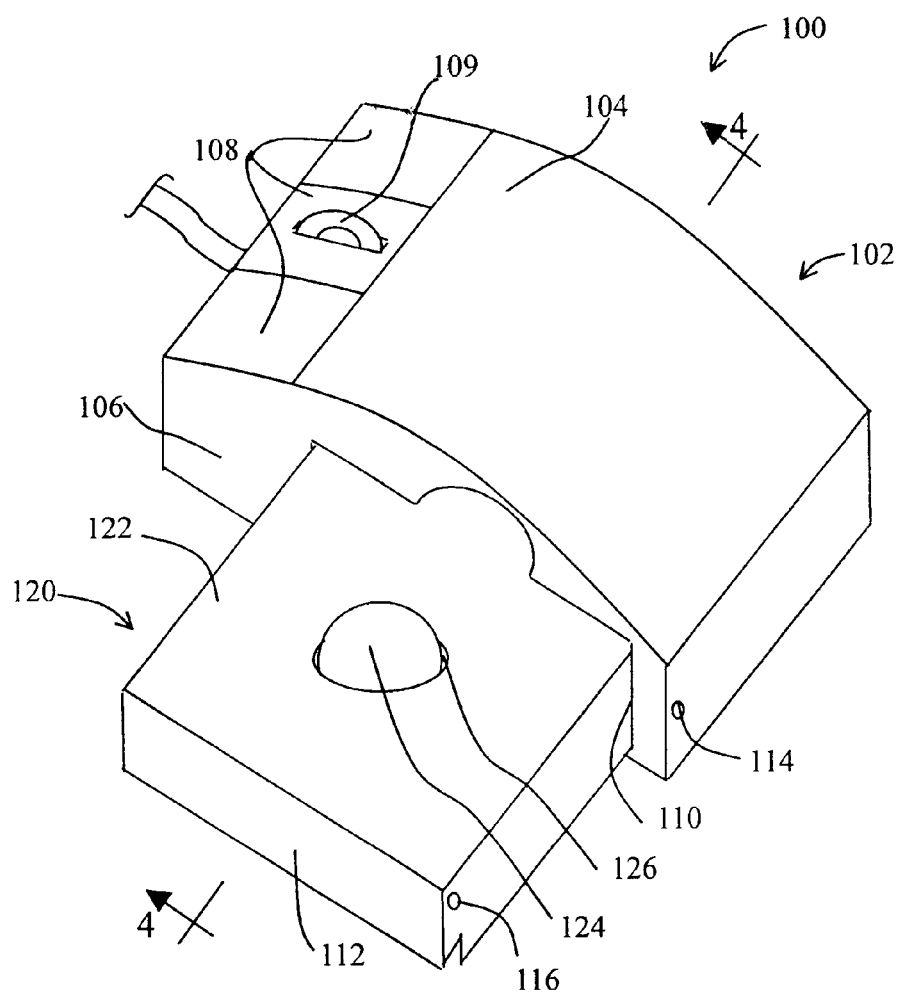
FIG. 1 is a perspective view of a first embodiment of a combined mouse and trackball according to the invention configured for operation in a trackball mode.
Figure 6:
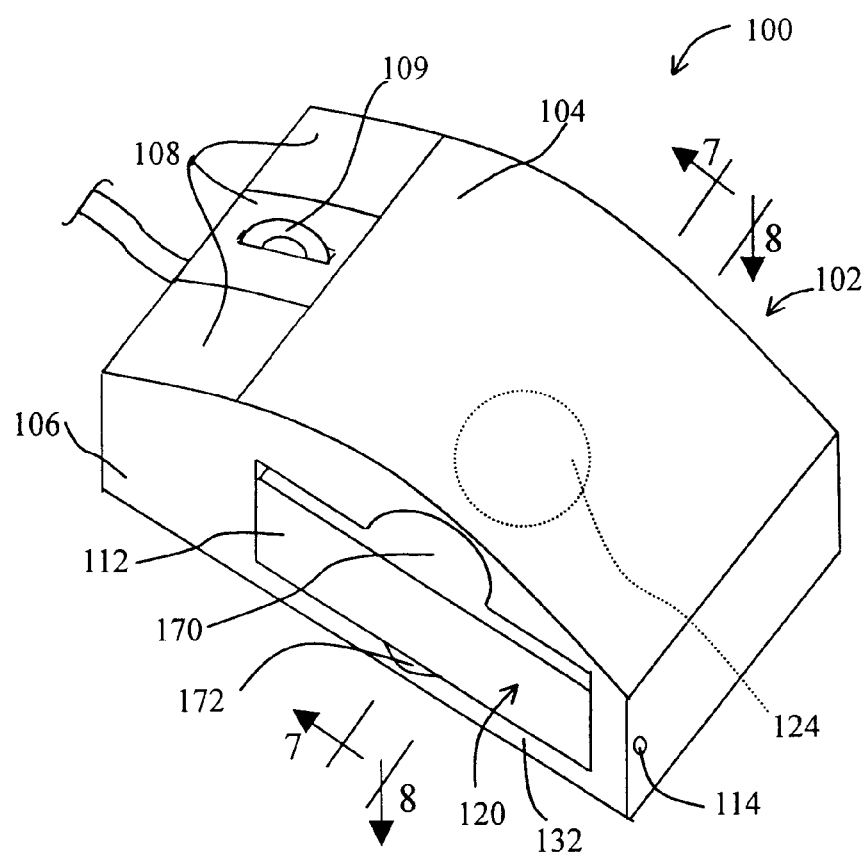
FIG. 6 is a perspective view of the combined mouse and trackball of FIG. 1 configured for operation in a mouse mode.
Figure 7:
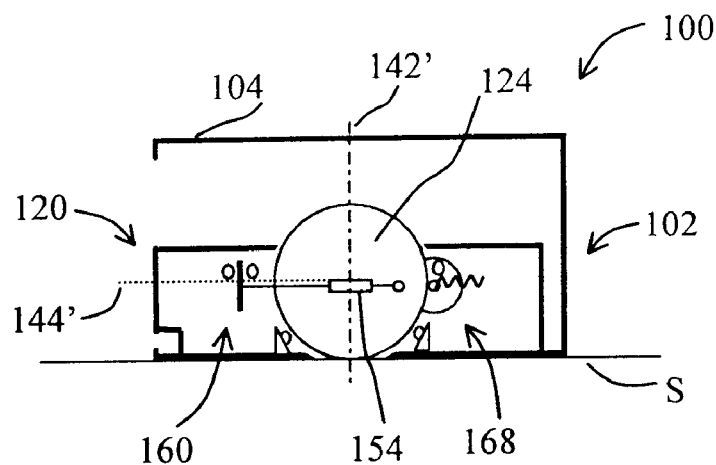
FIG. 7 is an elevational section on the line 7—7 of FIG. 6.
Figure 8:
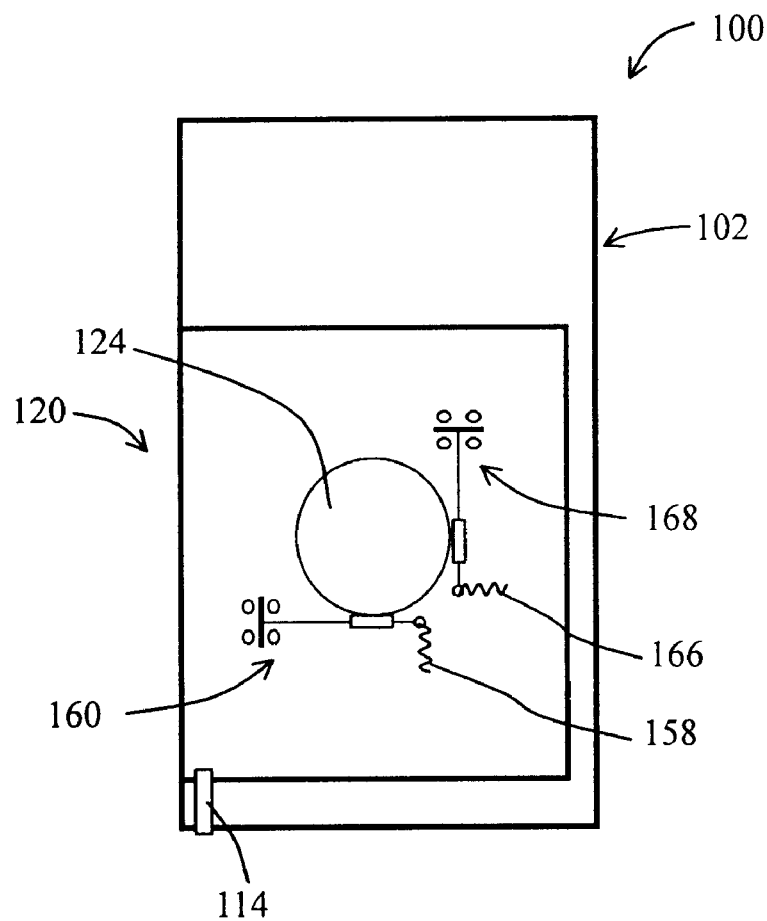
FIG. 8 is a plan section on the line 8—8 of FIG. 6.
Figure 9:
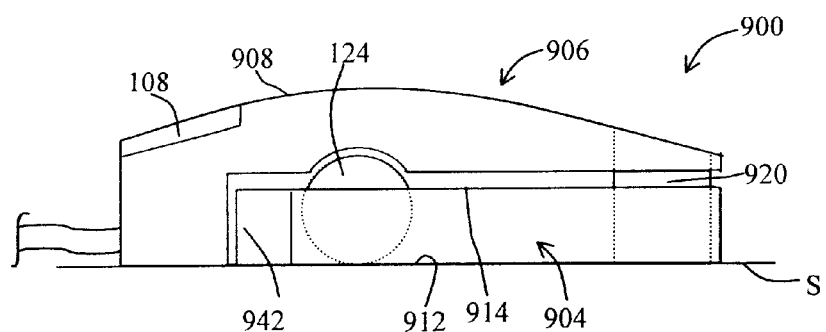
FIG. 9 is a side elevational view of a combined mouse and trackball according to a second embodiment of the invention.

FIG. 1 shows an input device 100 according to the first embodiment of the invention. Input device 100 can be configured for operation either as a mouse or as a trackball. Input device 100 has an outer housing 102. One or more function buttons 108 are located on a top surface 104 of outer housing 102. A wheel 109 may also be provided on top surface 104. An inner housing 120 which serves as a ball-carrying member is slidably mounted to outer housing 102. Inner housing 120 can be either in a first position in which it is received within outer housing 102, as shown in FIGS. 6, 7, and 8, or in a second position in which it is extended from outer housing 102 through an opening 110, as shown in FIGS. 1, 2, 3 and 4. Where the user of device 100 is right-handed, opening 110 is on the left side 106 of outer housing 102.

Figure 2:
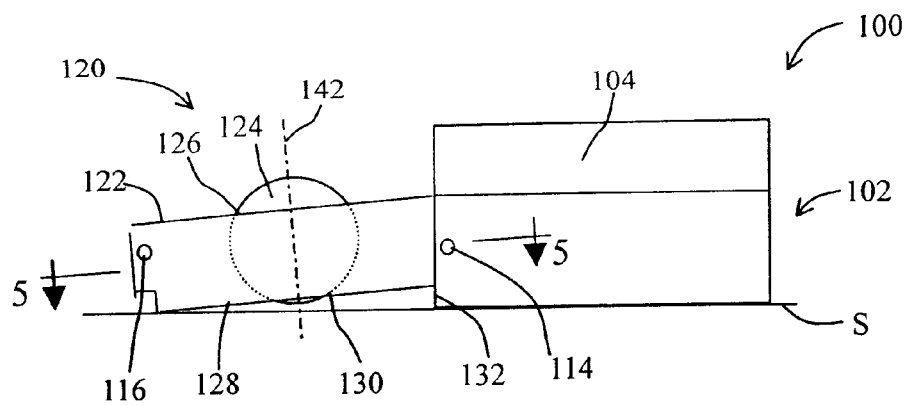
FIG. 2 is a front elevational view of the combined mouse and trackball of FIG. 1.
Figure 3:
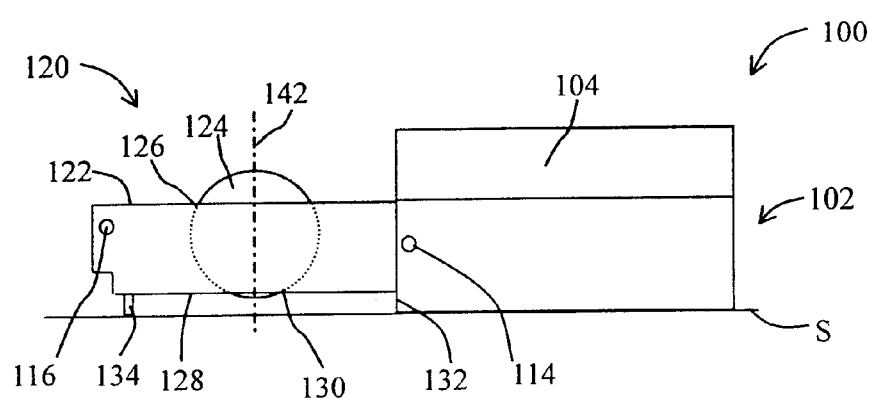
FIG. 3 is a front elevational view of a combined mouse and trackball according to a variation of the embodiment of FIG. 1.
Figure 4:
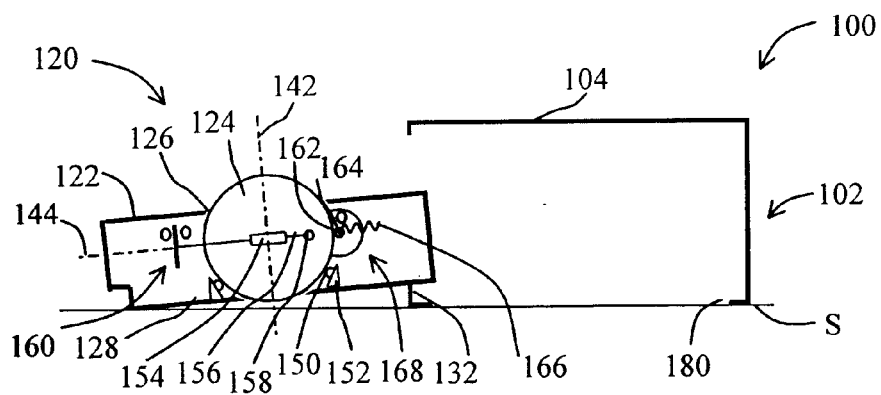
FIG. 4 is an elevational section on the line 4—4 through the combined mouse and trackball of the embodiment of FIG. 1.
Figure 5:
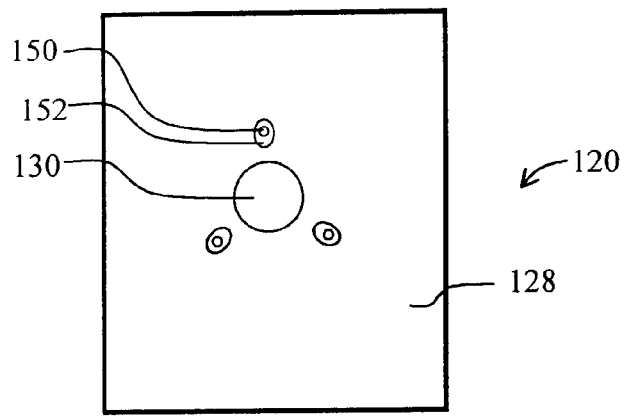
FIG. 5 is a top plan section on the line 5—5 through the ball-carrying portion of the combined mouse and trackball of the embodiment of FIG. 2.

A ball 124 is rotationally secured to inner housing 120. Ball 124 may be supported in any suitable way which permits it to rotate freely, both when input device 100 is being used as a mouse and when input device 100 is being used as a trackball. In the illustrated embodiment (FIGS. 4 and 5), ball 124 is supported on three small bearing balls 150 which are located on the top ends of supports 152. Preferably, supports 152 are equally spaced apart around an aperture 130 on bottom surface 128 of inner housing 120. Upper and lower portions of ball 124 protrude respectively through an aperture 126 on a top surface 122 of inner housing 120 and aperture 130. Ball 124, aperture 126 and aperture 130 are preferably concentric with respect to an axis 142 (FIGS. 2, 3 and 4).

Suitable sensors detect rolling motions of ball 124. Many kinds of suitable sensors which could be used for detecting the rotation of a ball in a mouse or trackball are known to those skilled in the art. The particular type of rotation sensor(s) used and the circuits, for delivering signals from the rotation sensor(s) to a host computer are matters of design choice. FIG. 4 shows one possible arrangement of sensors. The sensors of FIG. 4 include a pair of frictionally driven rollers. A roller 154 is placed to contact ball 124 on its horizontal centerline 144. Roller 154 is rotatable about an axis perpendicular to vertical axis 142. A spring 158 biases roller 154 against the surface of ball 124. Movements of ball 124 rotate roller 154 and its shaft 156. An encoder unit 160, which may comprise an optical encoder, converts rotations of shaft 156 into signals. Device 100 includes suitable wired or wireless means for delivering the signals to a host computer. A second roller 162 is arranged to be orthogonal to roller 154. Roller 162 is connected to a shaft 164. Roller 162 is biased against the outer surface of ball 124 by a spring 166. A second encoder unit 168 converts rotations of shaft 164 into signals which may also be transferred to the host computer in any suitable manner. Device 100 includes suitable circuitry and connecters for delivering signals caused by the actuation of function buttons 108 to a host computer.

Ball 124 typically sits at a slightly different height relative to inner housing 120 depending upon whether input device 100 is configured for operation as a mouse or as a trackball. When input device 100 is configured for use as a mouse, ball 124 contacts a surface "S" under the input device and is lifted along axis 142 relative to inner housing 120 by a small amount, such as ½ mm to 1 mm. This causes ball 124 to move upward slightly relative to rollers 154 and 162. Springs 158 and 166 bias rollers 154 and 162 against ball 124 so that rotational movements of ball 124 will be properly transferred to encoders 160 and 168 in both modes of operation. The particular choice of sensors for generating signals to be sent to a host computer and the manner in which those signals are conveyed to a host computer form no part of this invention. Various suitable sensors and signal transmission apparatus are known to those skilled in the art.

When inner housing 120 is received within outer housing 102, ball 124 projects both through aperture 130 in inner housing 120 and through an aperture 180 in outer housing 102. The lowermost portion of ball 124 projects below outer housing 102. Device 100 can then be used as a mouse by sliding device 100 across a flat surface "S". Ball 124 rolls across the flat surface "S" and signals generated by encoder units 160 and 168, which describe the rotation of ball 124, are sent to a host computer. Preferably top surface 104 of outer housing 102 is shaped ergonomically so that a user can grasp outer housing 102 comfortably with the user's hand in a position such that the user can easily operate function buttons 108 and wheel 109.

When pointing device 100 is configured for operation as a mouse, as shown in FIGS. 6, 7 and 8 left side 112 of inner housing 120 is congruous with the left side 106 of outer housing 102 so that input device 100 has the size of outer housing 102. Inner housing 120 is held in place by the portions of outer housing 102 surrounding aperture 180 which abut against inner housing 120 and prevent inner housing 120 from accidentally moving into its extended position. A user can hold and move input device 100 on a flat surface in the way he or she would operate a conventional mouse. Outer housing 102 and inner housing 120 can be constructed so that there is sufficient friction between them that input device 100 remains in its mouse configuration during normal use as a mouse, and remains configured as a trackball during normal operation as a trackball.

A latch, for example a pin 114 engageable in a recess 116 (see FIG. 1), or a detent mechanism (not shown) may be added to keep inner housing 120 in a desired configuration relative to outer housing 120 until it is desired to change that configuration. For example, when device 100 is in its mouse configuration and pin 114 is engaged in recess 116, pin 114 prevents inner housing 120 from sliding out of outer housing 102. A user can retract pin 114 from recess 116 to allow inner housing 120 to be extended to a position where device 100 can be used as a trackball.

A device 100 could optionally be constructed so that, when device 100 is configured as a mouse, the width of the part of device 100 gripped by a user could be adjusted to suit a user's hand by partially sliding inner housing 102 out of inner housing 120 and locking it in place using a suitable latching mechanism. Thus, a user with a big hand could adjust device 100 to be relatively wide, when in its mouse mode, and a user with a small hand could adjust device 100 to be narrower, when in its mouse mode.

Input device 100 can be configured for operation as a trackball by moving inner housing 120 to its extended position as shown in FIG. 1. Moving inner housing 120 to its extended position displaces ball 124 laterally so that ball 124 becomes offset from function buttons 108. In the illustrated embodiment, this may be done by grasping inner housing 120 and then slightly lifting the outer edge of inner housing 120 so that inner housing 120 clears the abutting edge of aperture 180. Inner housing 120 can then be withdrawn through aperture 110 until it is fully extended, as shown in FIG. 1. As shown in FIG. 6, undercuts 170 and 172 provide clearance to allow ball 124 to be slid readily through aperture 110. Undercuts 170 and 172 also make it easier for a user to grasp the outer edge of inner housing 120 with his or her fingers in preparation for moving inner housing 120 to its extended position relative to outer housing 102.

When inner housing 120 has been extended, inner housing 120 is supported on a flat surface "S" with the inner edge of inner housing 120 resting on a lower portion 132 of left side 106 of outer housing 102. Lower portion 132 has a height such that inner housing 120 supports ball 124 clear of surface "S". A user can then directly rotate ball 124 by moving the portion of ball 124 projecting upwardly through aperture 126. When input device 100 is configured for use as a trackball, as shown in FIG. 1, the user can manipulate ball 124 with his or her right thumb and operate function buttons 108 with the forefinger of the user's right hand. The palm of the user's hand rests on the upper surface of the outer housing 102. Function buttons 108 are offset from ball 124 so that a user can adopt a comfortable and ergonomically sensible hand position when using input device 100 as a trackball. Inner housing 120 can also be optionally extended to different degrees. This permits a user to adjust device 100 to comfortably accommodate different sizes of hand by setting the distance between function buttons 108 and ball 124 and between ball 124 and the surface upon which the user's hand rests.

As shown in FIG. 3, a prop 134 may optionally be located on inner housing 120 to support the outer edge of inner housing 120 at a slight distance above surface "S" when input device 100 is being used as a trackball. Prop 134 is preferably equal in height to lower portion 132 so that inner housing 120 is generally parallel to surface "S". When input device 100 is being used as a mouse, prop 134 can be folded flush with, or recessed below, the surface of inner housing 120.

It can be appreciated that the input device 100 has several advantages over prior art input devices. Input device 100 can be used either as a mouse or as a trackball. A user can easily switch between these modes of operation, as described above, and can thereby reduce the risk of repetitive strain injury which could arise from the prolonged use of the same set of muscles. Further, an input device 100 can be designed in a way which permits the ergonomics for both mouse and trackball operations to be optimized. Prior convertible computer input devices have designs which are constrained in a way which prohibits the devices from being ergonomically optimized for one or both modes of operation. When input device 100 is configured for use as a trackball, the distance between ball 124 and function buttons 108 can be adjusted to fit an individual user's hand size by moving inner housing 120 relative to outer housing 102. Since input device 100 can be collapsed into a small size, it is convenient for a user to carry it around. Since input device can be used both as a mouse and as a trackball it is well adapted for use in situations, such as mobile computing, where a large, flat surface "S" might not be available.

The input device 100 shown in FIG. 1 is intended for operation by a user's right hand. An input device 100 could be made as a mirror image of the input device 100 shown in FIGS. 1 through 8 to fit a user's left hand. Input device 100 could also be made in a manner such that inner housing 120 could be selectively extended to either side of outer housing 102. The same input device 100 could then be used comfortably by both left handed users and right handed users.

The device 100 has a row of function buttons 108. In the embodiment of FIGS. 1 to 8, ball-carrying-member 120 is displaced in a direction generally parallel to the row of function buttons 108 in moving between its "mouse" configuration and its "trackball" configuration.

FIGS. 9 through 14 show an input device 900 according to a second embodiment of the invention. Input device 900 has a ball-carrying member 904 which is pivotally attached to an outer housing 906. A ball 124 is supported on ball-carrying member 904 so that ball 124 can rotate relative to ball-carrying member 904. Ball 124 may be supported by ball-carrying member 904 in substantially the same manner that ball 124 is supported for rotation in manner housing 102 of the embodiment of the invention shown in FIGS. 1 through 8. An upper surface 908 of input device 900 supports one or more function buttons 108 and is shaped to fit comfortably a user's hand.

Ball 124 projects slightly below the bottom surface 912 of ball-carrying member 904. Ball 124 also projects from an upper surface 914 of ball-carrying member 904.

Figure 10:
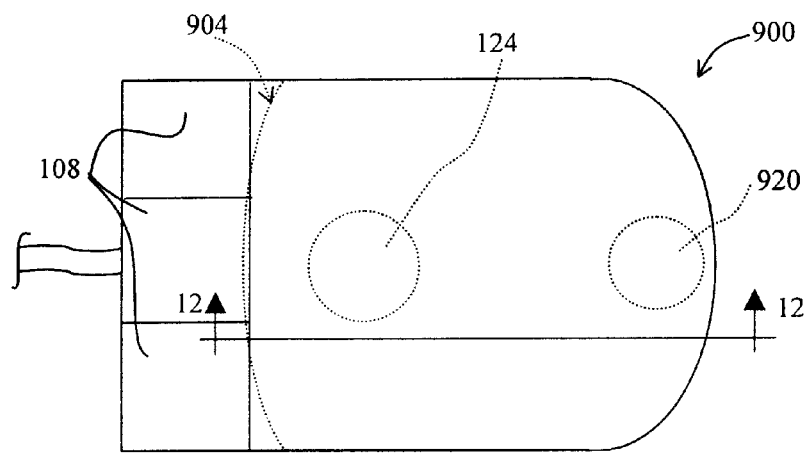
FIG. 10 is a top plan view of the combined mouse and trackball of FIG. 9 configured for operation in a mouse mode.
Figure 11:
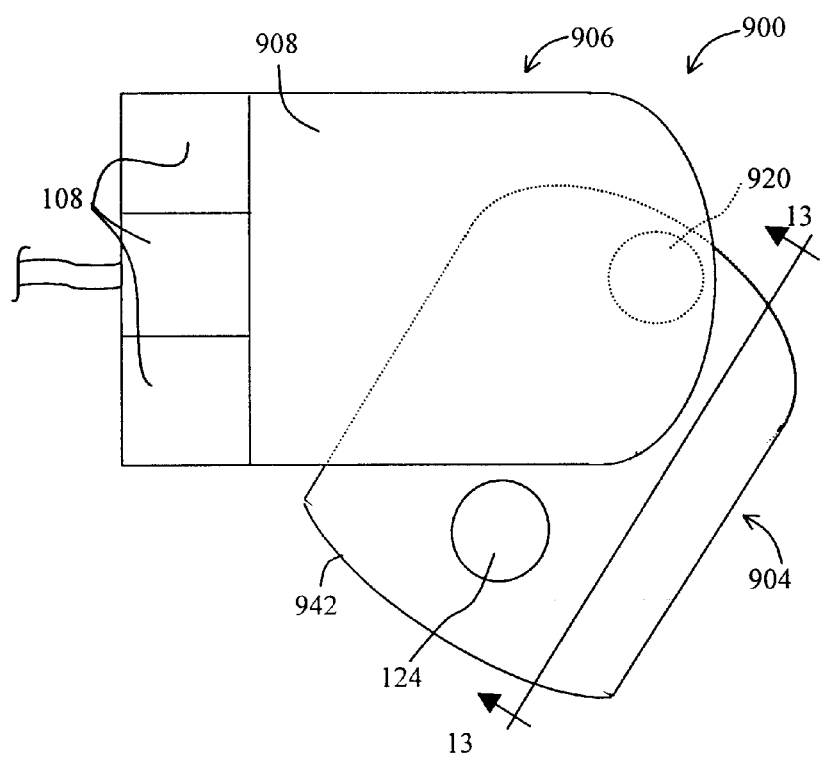
FIG. 11 is a top plan view of the combined mouse and trackball of FIG. 9 configured for operation in a trackball mode.

Ball-carrying member 904 pivots about a post 920 which is attached to outer housing 906. In a first position of ball-carrying member 904, ball 124 is more or less centrally located under outer housing 906. This configuration is shown in FIG. 10. When ball-carrying member 904 is in its first position, ball 124 can roll against a surface "S" which is located underneath input device 900. Input device 900 can be used in the same manner as a conventional mouse. Ball-carrying member 904 can be pivoted about post 920 to a second position as illustrated in FIG. 11. As ball-carrying member 904 is pivoted about post 920, one end 922 of ball-carrying member 904 is lifted vertically away from surface "S" (See FIGS. 12 and 13).

Figure 13:
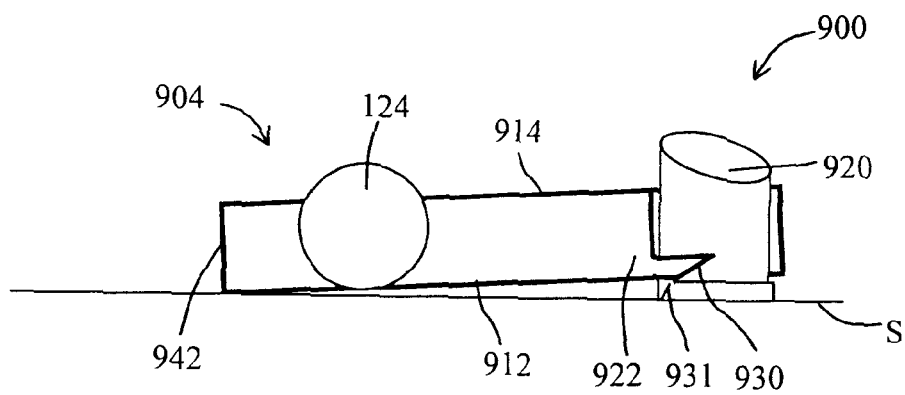
FIG. 13 is a section through a ball-carrying member of the combined mouse and trackball of FIG. 9 on the line 13—13 of FIG. 11.

As shown in FIGS. 11 and 13, when ball-carrying member 904 is in its second position, ball 124 is accessible to be manipulated by the thumb of a user and end 922 of ball-carrying member 904 has been lifted sufficiently that ball 124 is clear of surface "S" and can be freely rotated by the user. In the configuration shown in FIG. 11, input device 900 can be used as a trackball. In this configuration, ball 124 is in a comfortable location to be manipulated by the user's right thumb. The user's hand can rest comfortably on ergonomically shaped upper surface 908 of outer housing 906, and the angle of rotation of ball-carrying member 904 relative to outer housing 906 can be adjusted to accommodate users having hands of different sizes.

Figure 12:
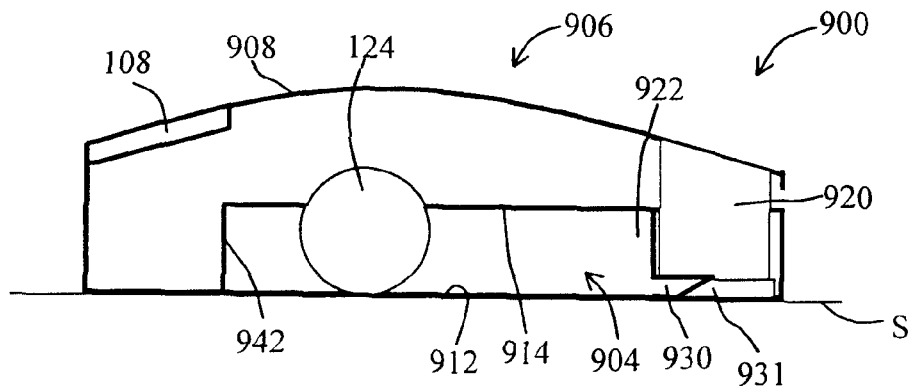
FIG. 12 is a section through a ball-carrying member of the combined mouse and trackball of FIG. 9 on the line 12—12 of FIG. 10.
Figure 14:
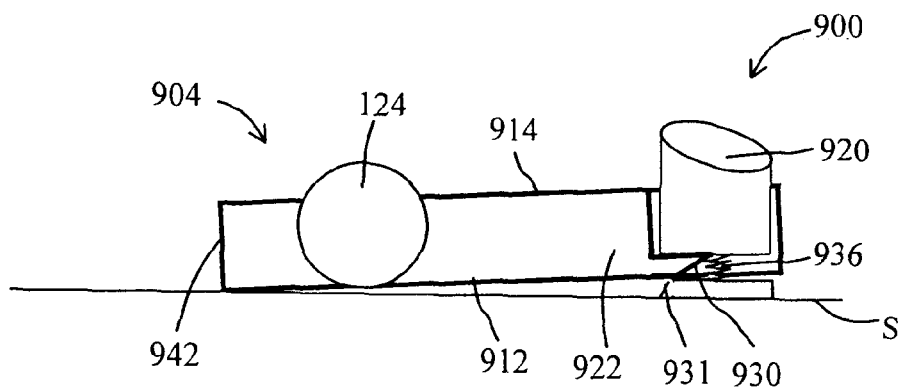
FIG. 14 is a section through a ball-carrying member of the combined mouse and trackball according to a variant of the embodiment of FIG. 9.

FIGS. 12 and 13 illustrate one possible mechanism for lifting one end 922 of ball-carrying member 904 so that ball 124 is supported clear of surface "S" when input device 900 is configured for operation as a trackball. In the embodiment shown in FIGS. 12 and 13, ball-carrying member 904 includes a ramp portion 930 which, when ball-carrying member 904 is in its first position, is adjacent to a ramp member 931 at the lower end of post 920. As ball-carrying member 904 is rotated relative to post 920, ramp 930 rides up ramp 931, thereby lifting end 922 of ball-carrying member 904 clear of surface "S", as shown in FIG. 13. FIG. 14 shows an alternative arrangement for lifting end 922 of ball-carrying member 904 away from surface "S". In the variant shown in FIG. 14, post 920 is movable relative to ramp 931 and is biased toward ramp 931 by a spring 936, or other suitable bias means. When ball-carrying member 904 is rotated relative to outer housing 906, ramp 930 rides up ramp 931 and lifts post 920 away from surface "S" together with end 922 of ball-carrying member 904.

While the drawings shown above illustrate devices in which ball-carrying member 904 both pivots around post 920 and is lifted from surface "S" at the same end 922. A second end 942 of ball-carrying member 904 could be lifted away from surface "S" instead of end 922. By way of example, end 942 of ball-carrying member 904 could include a pin which slides in a groove in an adjacent portion of outer housing 906. The groove could cause end 942 to be lifted upwardly as ball-carrying member 904 is pivoted outwardly to the configuration shown in FIG. 11. An advantage of the input device 900 shown in FIGS. 9 through 14 is that the same input device can be used for both right and left handed users. A left handed user would pivot ball-carrying member 904 to the other side of housing 906.

FIGS. 15 through 22 show an input device 1500 according to a third embodiment of the invention. Input device 1500 has a ball-carrying member 1504 which is pivotally attached to an outer housing 1506. Outer housing 1506 has an upper surface 1508 which is shaped to form a surface upon which a user can comfortably rest his or her hand. Upper surface 1508 has one or more function buttons 108 located where they can be conveniently actuated by a user's fingers. A ball 124 is rotatably mounted in ball-carrying member 1504.

Figure 15:
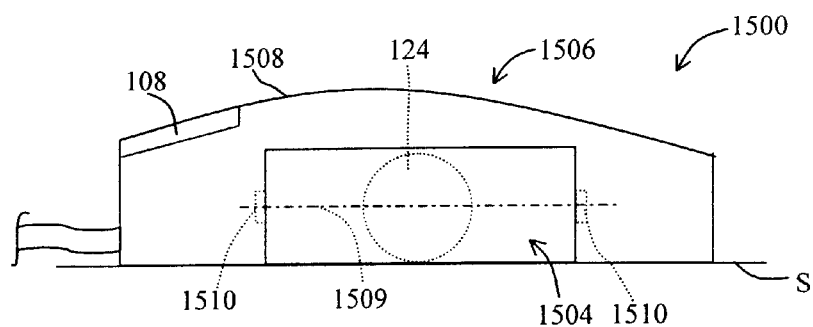
FIG. 15 is a side elevational view of a combined mouse and trackball according to a third embodiment of the invention.
Figure 16:
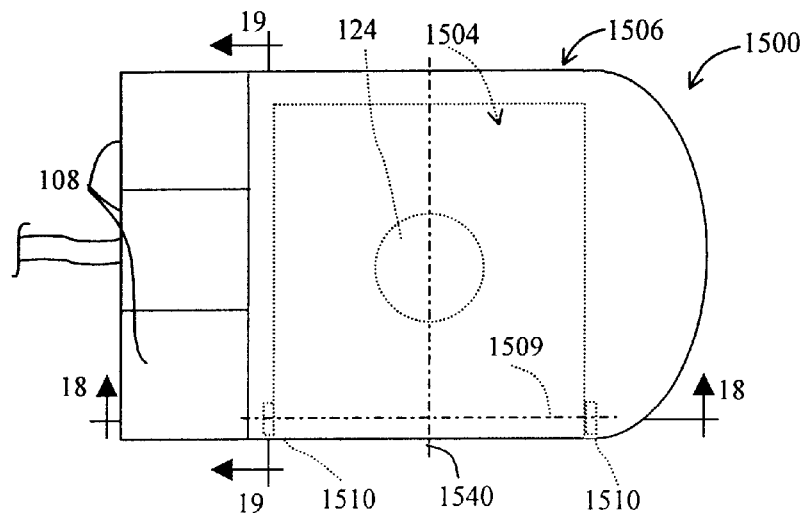
FIG. 16 is a top plan view of the combined mouse and trackball of FIG. 15 configured for operation in a mouse mode.
Figure 17:
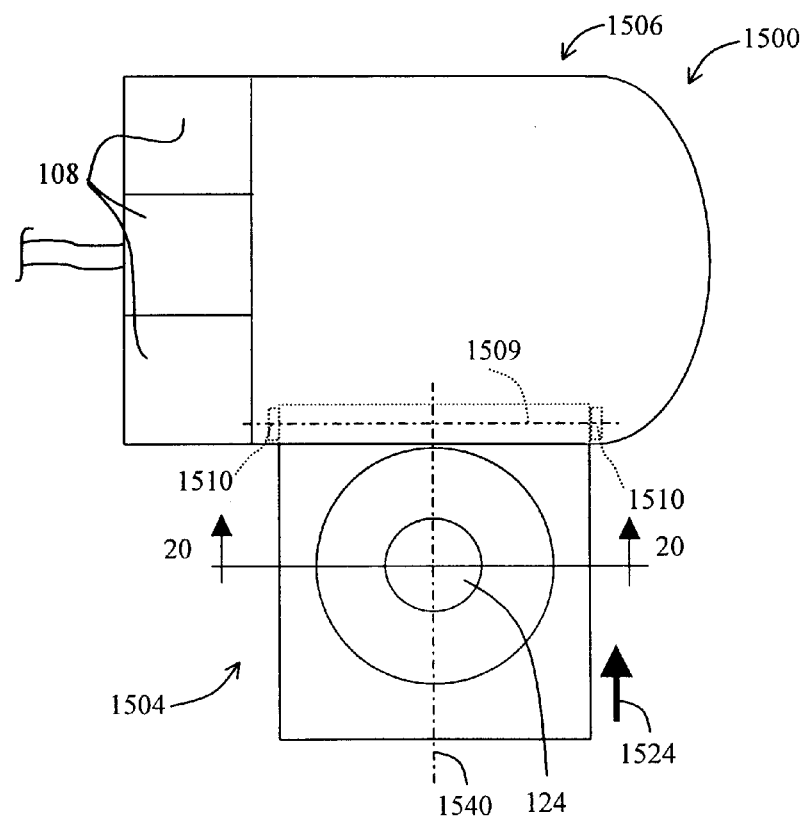
FIG. 17 is a top plan view of the combined mouse and trackball of FIG. 15 configured for operation in a trackball mode.

Ball-carrying member 1504 is pivotally mounted to outer housing 1506 by pivot pins 1510. Ball-carrying member 1504 can be rotated relative to outer housing 1506 about a generally horizontal axis 1509 defined by pivot pins 1510. Ball-carrying member 1504 has a first position in which ball 124 projects downwardly as shown in FIG. 15 and rests in contact with a surface "S" beneath input device 1500. As shown in FIGS. 15 and 16, when ball-carrying member 1504 is in this first position, input device 1500 can be used as a conventional mouse. A latch or detent mechanism (not shown) may be provided to retain ball-carrying member 1504 in the position shown in FIGS. 15 and 16. As shown in FIG. 17, ball-carrying member 1504 can be rotated about pivot pins 1510 until ball 124 is facing upwardly and is offset relative to outer housing to 1506. In this second position, ball 124 is supported by bearings 1511, shown in FIG. 20. When ball-carrying member 1504 is in its second position, as illustrated in FIG. 17, then a user can manipulate ball 124 with his or her thumb while resting his or her hand on upper surface 1508 of outer housing 1506 in a position from which it is comfortable for the user to operate function buttons 108.

Figure 18:
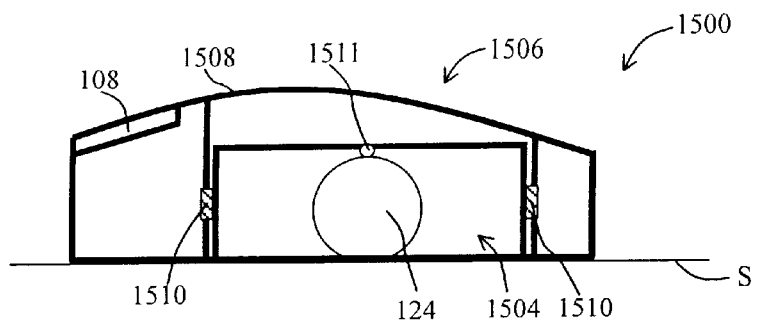
FIG. 18 is an elevational section through the combined mouse and trackball of FIG. 15 on the line 18—18 of FIG. 16.
Figure 19:
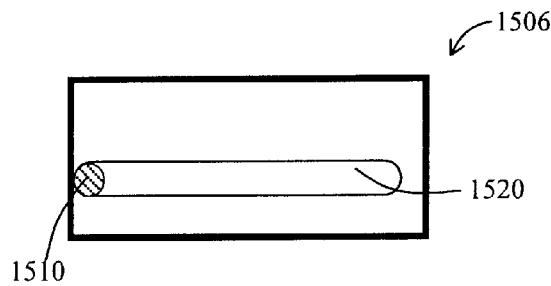
FIG. 19 is an elevational section through the combined mouse and trackball of FIG. 15 on the line 19—19 of FIG. 16.
Figure 21:
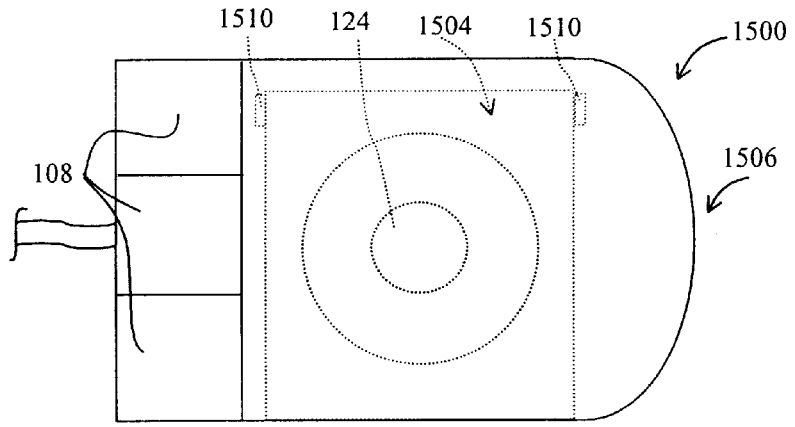
FIG. 21 is a top plan view of a combined mouse and trackball according to a variant of the embodiment of FIG. 15 configured for storage.

Preferably pins 1510 are received in elongated slots 1520 which extend transversely in portions of outer housing 1506 which face ball-carrying member 1504 (FIGS. 18 and 19). With this construction, when ball-carrying member 1504 is in its second position as illustrated in FIG. 17, ball-carrying member 1504 can be pushed in the direction of arrow 1524 until ball-carrying member 1504 is received within outer housing 1506 in a "storage" configuration. When ball-carrying member 1504 is received in outer housing 1506 ball 124 is protected between ball-carrying member 1504 and upper surface 1508 of outer housing 1506, as shown in FIG. 21.

It can be appreciated that the angular direction in which a user would intuitively move device 1500, in its mouse configuration (FIG. 16), to move a cursor in the positive "y" direction causes rotation of ball 124 in an angular direction which is opposite to the angular direction in which a user would intuitively rotate ball 124 to cause the same cursor movement when device 1500 is configured as a trackball (FIG. 17). To make the operation of input device 1500 spatially compatible for both configurations, input device 1500 preferably includes a switch (not shown). The switch reverses the angular direction of rotation indicated by the signal generated by the encoder(s) which sense motion of ball 124 about an axis 1540 (FIGS. 16 and 17) which is perpendicular to axis 1509 when ball-carrying member 1504 is rotated from the configuration of FIG. 16 to the configuration of FIG. 17. One of many possible embodiments of input device 1500 includes a micro-switch which changes states to reverse the signal generated by the encoder(s) when ball-carrying member 1504 is moved between these two configurations.

Figure 20:
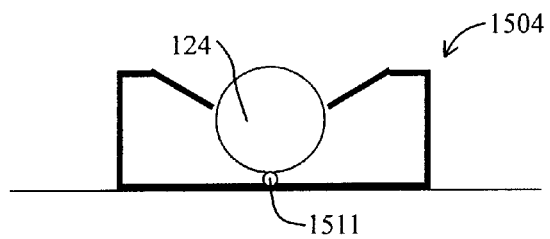
FIG. 20 is an elevational section through the combined mouse and trackball of FIG. 15 on the line 20—20 of FIG. 17.

Preferably a surface of ball-carrying member 1504 which is uppermost when ball-carrying member 1504 is extended, as shown in FIG. 17, is recessed to assist a user in locating and operating ball 124 with the user's thumb while input device 1500 is being used as a trackball (FIG. 20).

Figure 22:
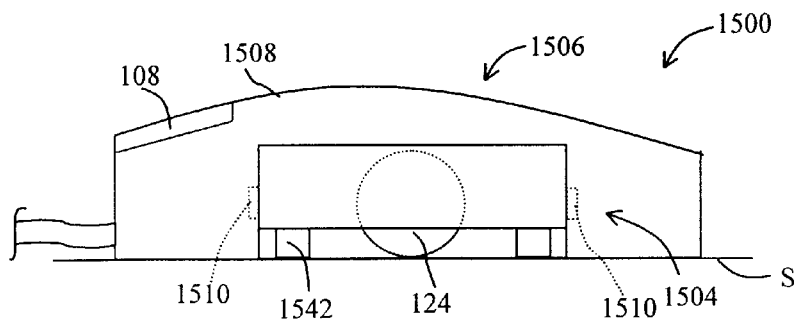
FIG. 22 is a side elevational view of a combined mouse and trackball according to another variant of the embodiment of FIG. 15.

FIG. 22 shows an alternative version of ball-carrying member 1504 wherein the surface of ball-carrying member 1504 from which ball 124 projects is generally planar and has projecting legs 1542 which support ball-carrying member 1504 so that it is spaced apart from an underlying surface "S" when input device 1500 is being used as a mouse.

FIGS. 23 through 27 show an input device 2300 according to a fourth embodiment of the invention. Input device 2300 has a ball-carrying member 2304 within which is mounted a ball 124 substantially in the manner described above. Ball-carrying member 2304 is pivotally mounted to an outer housing 2306 which may be substantially similar to the outer housing 906 of the input device 900 which is described above.

Ball 124 projects from one side of ball-carrying member 2304. Ball-carrying member 2304 has two portions which are pivotally attached to one another. A first portion 2304A is pivotally attached to outer housing 2306 for rotation about a generally vertical axis 2310. This may be accomplished, for example, by providing a post 2320 which passes through an aperture in portion 2304A. Ball 124 is mounted in a second portion, 2304B of ball-carrying member 2304. Portion 2304B is pivotally attached to portion 2304A for rotation about an axis 2312.

Figure 23:
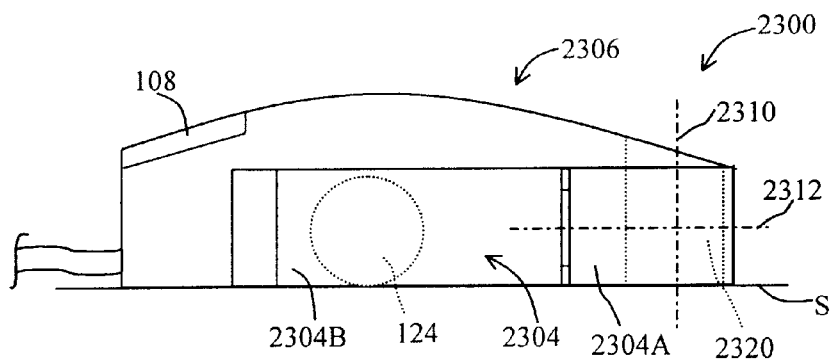
FIG. 23 is a side elevational view of a combined mouse and trackball according to a fourth embodiment of the invention.
Figure 24:
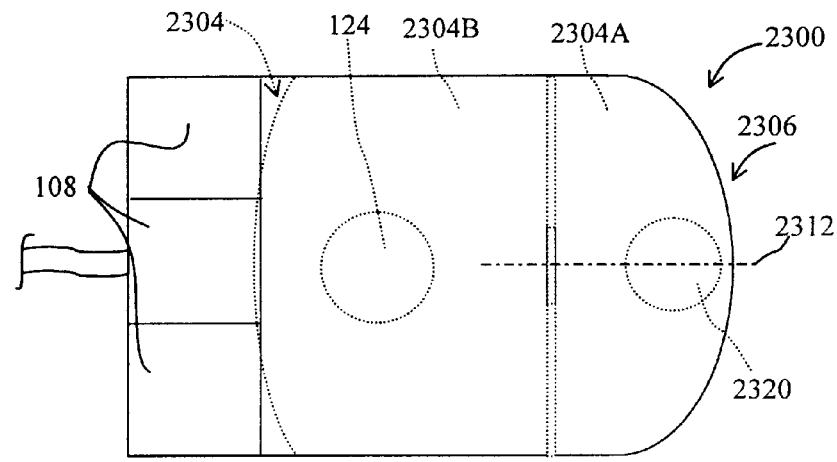
FIG. 24 is a top plan view of the combined mouse and trackball of FIG. 23 configured for operation in a mouse mode.
Figure 25:
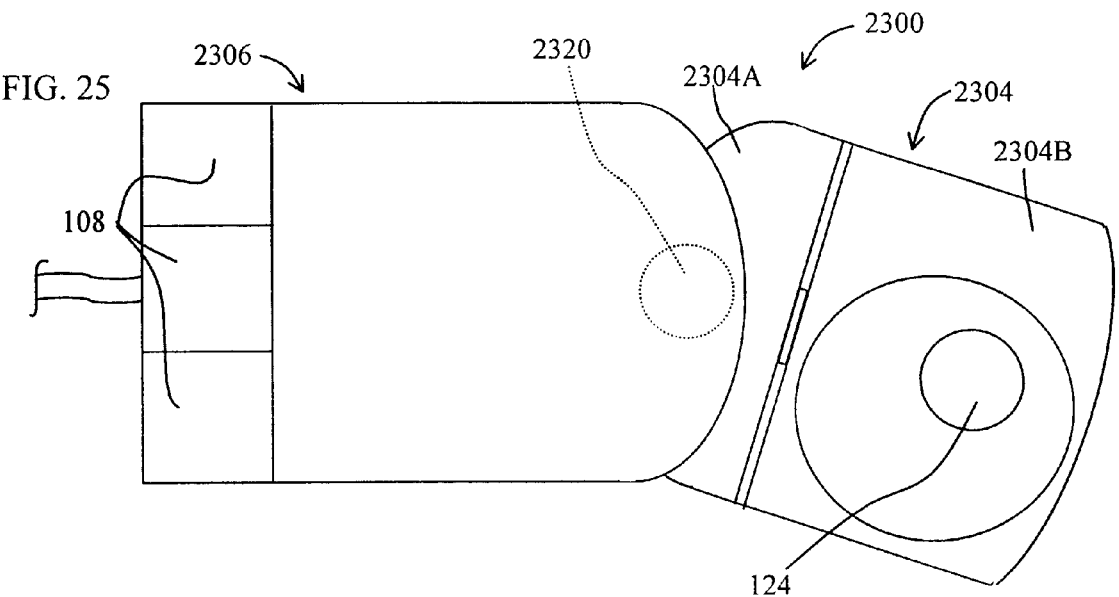
FIG. 25 is a top plan view of the combined mouse and trackball of FIG. 23 in a partially opened configuration.
Figure 26:
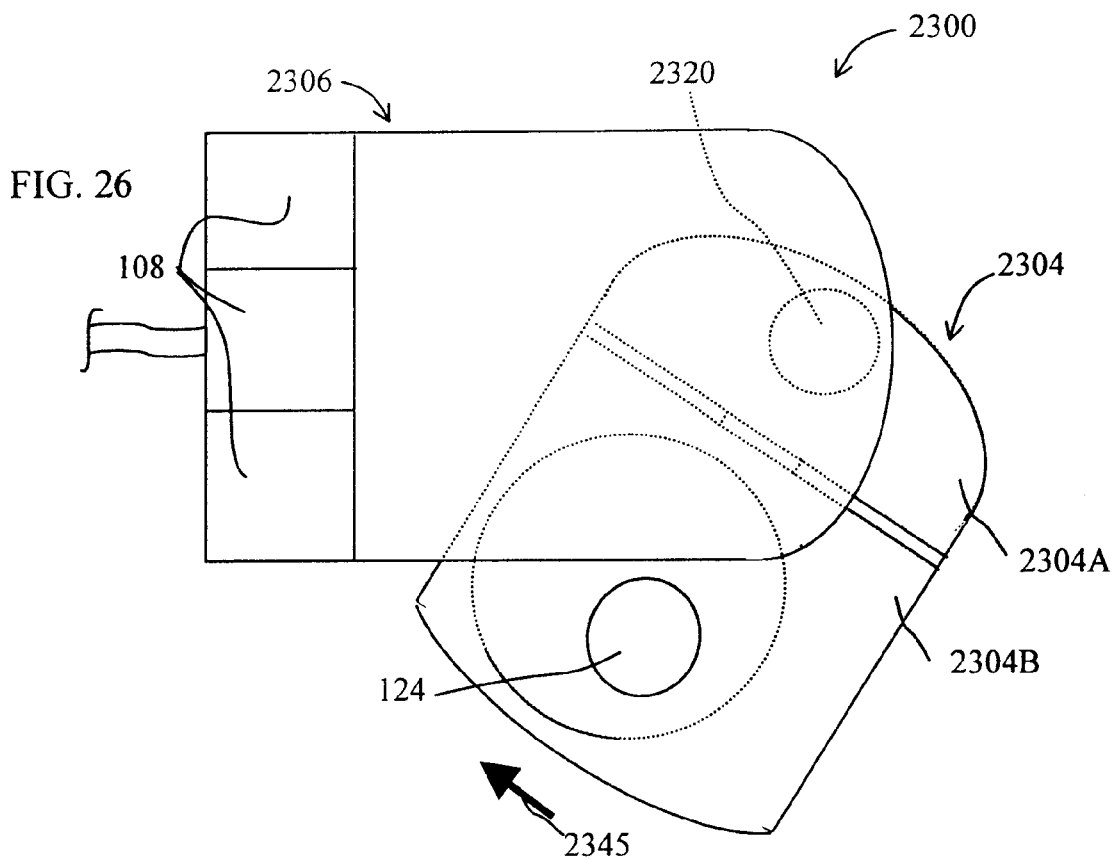
FIG. 26 is a top plan view of the combined mouse and trackball of FIG. 23 configured for operation in a trackball mode.

When input device 2300 is configured as in FIG. 23, ball 124 projects downwardly from a lower surface of portion 2304B to rest against a surface "S" underlying input device 2300. In this configuration, input device 2300 can be used as a conventional mouse. Ball-carrying member 2304 can be manipulated to place ball 124 in a position such that input device 2300 can be used as a conventional trackball by pivoting ball-carrying member 2304 about axis 2310 until it is possible to rotate second portion 2304B about axis 2312 as shown in FIG. 25. Second portion 2304B is rotated until the face from which ball 124 projects is facing upwardly. Ball-carrying member 2304 can then be pivoted back about axis 2310 until ball 124 is in a position which can be comfortably reached by a user's thumb, as shown in FIG. 26. As is the case with the embodiment of the invention illustrated by input device 1500, flipping over portion 2304B of ball-carrying member 2304 causes the direction of rotation of ball 124 as sensed by certain sensors in input device 2300 to be reversed. Consequently a switch (not shown) is preferably provided to reverse the direction of rotation indicated by some of the sensors in input device 2300.

Figure 27:
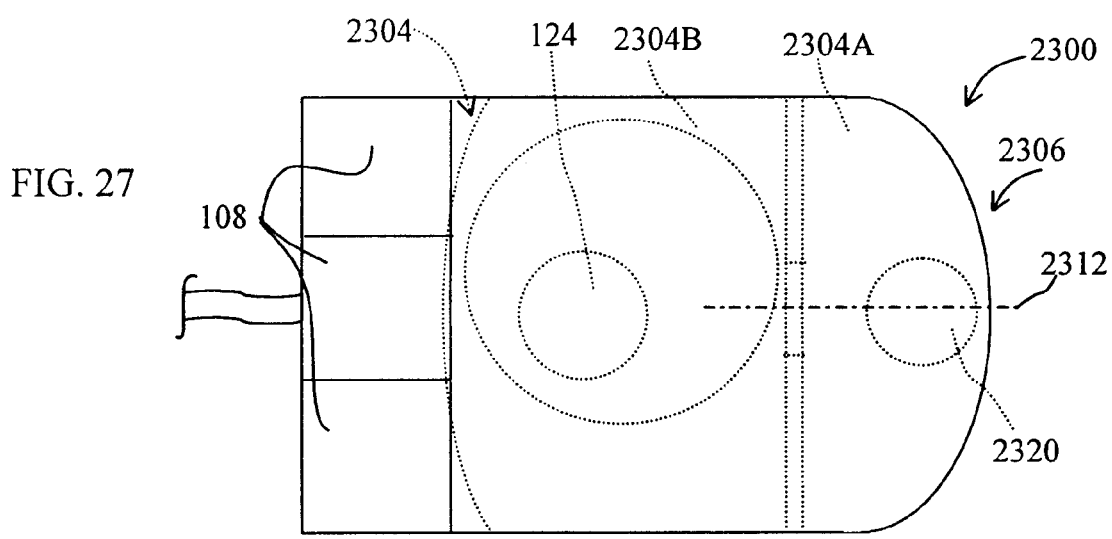
FIG. 27 is a top plan view of the combined mouse and trackball of FIG. 23 configured for storage.

It will be appreciated that input device 2300 can be folded up compactly for storage with ball 124 protected by outer housing 2306 by simply pivoting ball-carrying member 2304 inwardly, as indicated by arrow 2345 (FIG. 26) after input device 2300 has been configured as a trackball (with ball 124 facing upwardly). FIG. 27 shows device 2300 in its storage mode.

Figure 28:
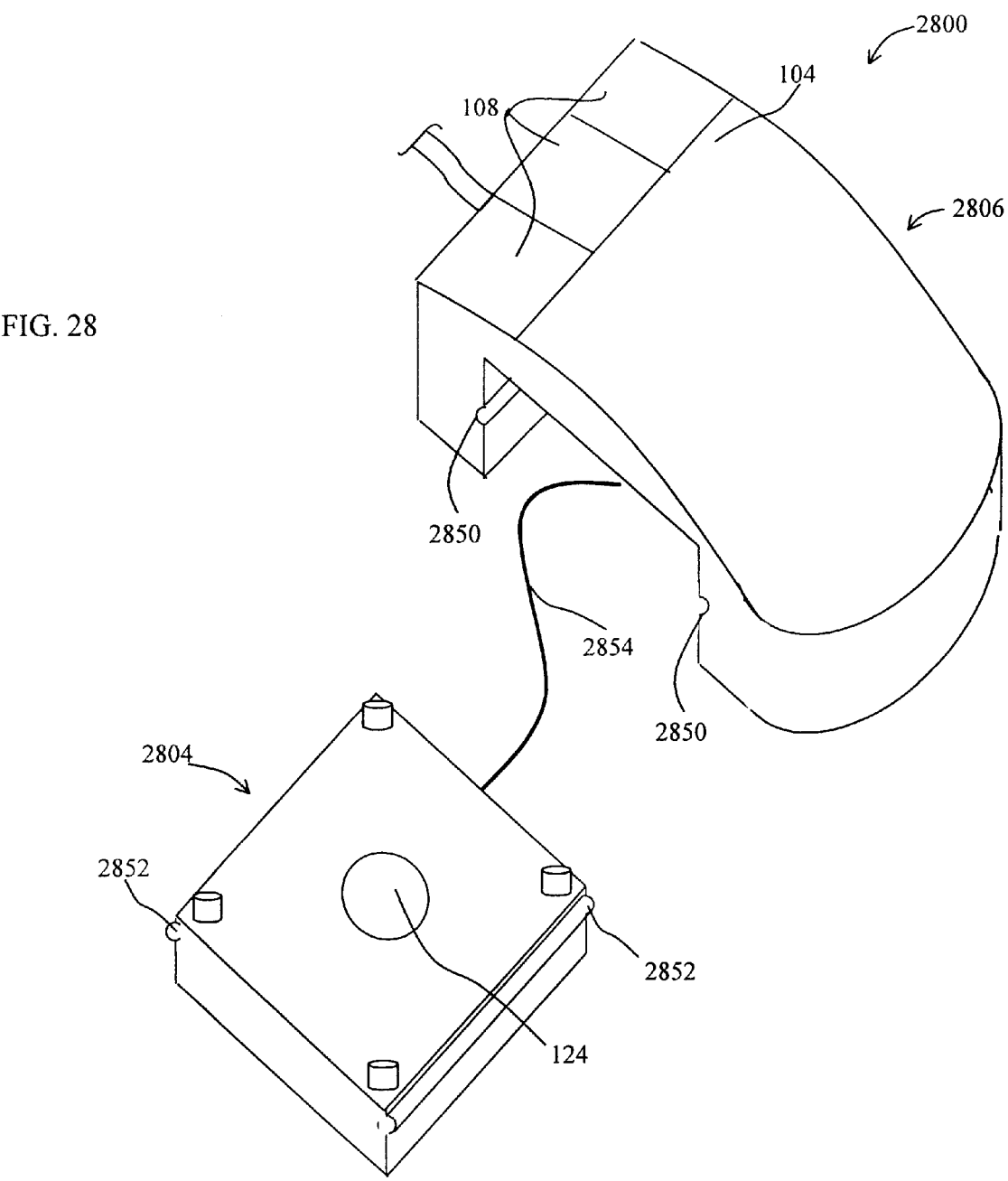
FIG. 28 is a perspective view of a combined mouse and trackball according to a fifth embodiment of the invention; and, FIG. 29 is a side elevational view of an optical sensor-carrying member which may be used in place of the ball-carrying member in the embodiment of FIG. 28.

FIG. 28 shows an input device 2800 according to a fifth embodiment of the invention. Input device 2800 has a ball-carrying member 2804 which can be slidably received within an outer housing 2806. Ball-carrying member 2804 can be inserted into outer housing 2806 so that ball 124 faces downwardly. Input device 2800 can then be used as a conventional mouse. Ball-carrying member 2804 may include supports for retaining ball 124 similar to those of embodiments 100, 900, 1500 and 2300.

To use input device 2800 as a trackball, ball-carrying member 2804 can be slid completely out from outer housing 2806, turned upside down and placed at a location a convenient distance from outer housing 2806. A cable 2854 conveys signals from sensors on ball-carrying member 2804 to a host computer (not shown). In the illustrated embodiment, cable 2854 passes through outer housing 2806. A user can then use input device 2800 as a trackball by placing the user's thumb on ball 124 and by manipulating function buttons 108 with the user's fingers.

Preferably ball-carrying member 2804 can be received within outer housing 2806 in each of two orientations. In one orientation, ball 124 is facing upwardly and is therefore protected by outer housing 2806. In this storage configuration ball 124 is protected inside outer housing 2806 of input device 2800.

In the embodiment illustrated in FIG. 28, ball-carrying member 2804 has rails 2852 on either side which can be slidably received within grooves 2850 in outer housing 2806. Preferably rails 2852 fit snugly enough into grooves 2850 that ball-carrying member 2804 can be engaged tightly enough within outer housing 2806 that ball-carrying member 2804 does not tend to move relative to outer housing 2806 while input device 2800 is used as a mouse. Preferably cable 2854 is long enough to permit ball-carrying member 2804 to be detached from outer housing 2806 and placed far enough away from outer housing 2806 to allow for comfortable two-handed input control. A user can use one hand to manipulate the ball 124 and the other hand to operate function buttons 108 on outer housing 2806. In two-handed operation, ball-carrying member may alternatively be used as a mouse or placed on its back and used as a trackball.

Figure 29:
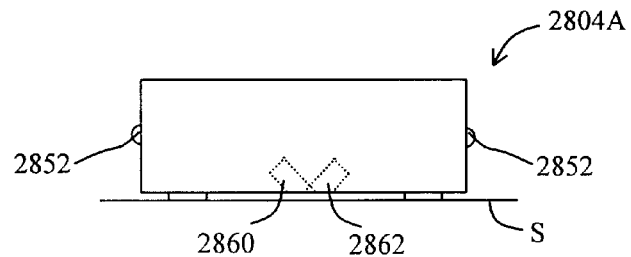

It can also be appreciated that ball-carrying member 2804 may carry other position sensors in place of a rotatable ball. For example, as shown in FIG. 29, a member 2804A similar to ball-carrying member 2804 could carry an optical (position) sensor which comprises a light source 2860 and a light sensor 2862. Other position sensors such as ultrasonic sensors, or infrared sensors could also be used. These sensors generate position signals which, upon transmission to a host computer, may control a graphic object (e.g. cursor) on the screen. When the position sensor-carrying member is extended far away from outer housing 2806, a user can have two-handed input, with one hand controlling the position sensor-carrying member, and the other hand engaging function buttons 108 on outer housing 2806. Two-handed input may reduce injuries and increase productivity in some cases. Two-handed input can also be used to play computer games that usually require a user to use both a computer keyboard and a conventional mouse.

Embodiments of the invention will provide paths for delivering signals from function buttons 108 and from the position sensor, whether it be a ball or another type of position sensor, to a host computer.

As will be apparent to those skilled in the art in the light of the foregoing disclosure, many alterations and modifications are possible in the practice of this invention without departing from the spirit or scope thereof. For example, function buttons 108 may be any suitable kind of control switch capable of being actuated by a user. Function buttons 108 are not limited to pushbuttons. Elements referred to in this disclosure as being housings do not need to completely enclose any other parts. The word housing is not used in a narrow sense in this specification. The ball-carrying members in the embodiments of FIGS. 1 through 27 may optionally be made detachable to facilitate two-handed operations as described above with reference to FIG. 28. Input devices according to the invention may communicate with a host computer in any convenient way. Input devices may be cordless and may transmit signals to a host computer using infrared, radio frequency or other technologies. Various wired and wireless systems for conveying signals from an input device to a host computer are known to those skilled in the art. Any such system could be applied to carrying signals generated by an input device according to this invention. Within the broad scope of this invention, the position sensor-carrying member of the function-button-carrying member can be coupled to permit relative motion of the function button(s) and position sensor in any direction. For example, ball-carrying member 2804 of FIG. 28 could allow ball 124 to be displaced to extend on the right-side, front side or rear side of outer housing 2806.

Accordingly, the scope of the invention is to be construed in accordance with the substance defined by the following claims.

I claim:

1. A computer input device comprising:
    a function-button-carrying member;
    a function button on the function-button-carrying member;
    a position-sensor-carrying member moveably coupled to the function-button-carrying member;
    a position sensor on the position-sensor-carrying member; wherein when the position-sensor-carrying member is in a first configuration relative to the function-button-carrying member, the input device is operable as a mouse; and wherein the-position-sensor-carrying member can be moved into a position relative to the function-button-carrying member wherein a user can operate the function button with one hand and can operate the position sensor with another hand, thereby using the computer input device for two handed input control.

2. The computer input device of claim 1 wherein, the position sensor comprises a rotatable ball and, when the position-sensor-carrying member is in a second configuration relative to the function-button-carrying member, a surface of the ball is exposed and the input device is usable as a trackball.

3. The computer input device of claim 1 wherein, when the position-sensor-carrying member is in a storage position relative to the function-button-carrying member, the position sensor is enclosed and protected by the positon-sensor-carrying member and the function-button-carrying member.

4. A computer input device comprising:
    a function-button-carrying member;
    a function button on the function-button-carrying member;
    a position-sensor-carrying member moveably coupled to the function-button-carrying member;
    a position sensor on the position-sensor-carrying member; wherein when the position-sensor-carrying member is in a first configuration relative to the function-button-carrying member, the input device is operable as a mouse, and wherein the position-sensor-carrying member is detachably coupled to the function-button-carrying member, such that the position-sensor-carrying member can be moved into a position relative to the function-button-carrying member wherein a user can operate the function button with one hand and can operate the position sensor with another hand, thereby using the computer input device for two handed input control.

5. A computer input device selectively operable as a mouse or as a trackball, the input device comprising:
    a function-button-carrying member;
    at least one function button on a face of the function-button-carrying member;
    a position-sensor-carrying member coupled to the function-button-carrying member; and,
    a position sensor on the position-sensor-carrying member, the position sensor comprising a ball supported for rotation on the position-sensor-carrying member and a sensor associated with the ball, the sensor adapted to generate a signal-describing rotation of the ball;
wherein the-position-sensor-carrying member is moveable relative to the function-button-carrying member between a first position, wherein the ball is located beneath the face of the function-button-carrying member and the ball is oriented to frictionally engage a surface under the input device and to detect relative motion between the input device and the surface under the input device so that the input device is usable as a mouse, and a second position, wherein the position-sensor-carrying member is displaced relative to the function-button-carrying member and the ball is oriented to detect relative motion between the ball and a user's hand so that the ball can be manually rotated to permit the input device to be used as a trackball, and wherein the position-sensor-carrying member is pivotable relative to the function-button-carrying member on a pivot axis and the input device comprises a switch associated with the sensor, the switch switching from a first state to a second state when the position-sensor-carrying member is moved from its first position to its second position, the switch operating to reverse an indicated sense of rotation about an axis perpendicular to the pivot axis when in its second state.

6. A computer input device selectively operable as a mouse or as a trackball, the input device comprising:
- a function-button-carrying member;
- at least one function button on a face of the function-button-carrying member;
- a position-sensor-carrying member coupled to the function-button-carrying member; and,
- a position sensor on the position-sensor-carrying member, the position sensor comprising a ball supported for rotation on the position-sensor-carrying member and a sensor associated with the ball, the sensor adapted to generate a signal describing rotation of the ball;

wherein the position-sensor-carrying member is moveable relative to the function-button-carrying member between a first position, wherein the ball is located beneath the face of the function-button-carrying member and the ball is oriented to frictionally engage a surface under the input device and to detect relative motion between the input device and the surface under the input device so that the input device is usable as a mouse, and a second position, wherein the position-sensor-carrying member is displaced relative to the function-button-carrying member and the ball is oriented to detect relative motion between the ball and a user's hand so that the ball can be manually rotated to permit the input device to be used as a trackball, and wherein the position-sensor-carrying member is movable pivotally relative to the function-button-carrying member about a generally vertical axis.

7. A computer input device selectively operable as a mouse or as a trackball, the input device comprising:
- a function-button-carrying member;
- at least one function button on a face of the function-button-carrying member;
- a position-sensor-carrying member coupled to the function-button-carrying member and pivotally moveable relative to the function-button-carrying member about a generally horizontal axis; and,
- a position sensor on the position-sensor-carrying member, the position sensor comprising a ball supported for rotation on the position-sensor-carrying member and a sensor associated with the ball, the sensor adapted to generate a signal describing rotation of the ball;

wherein the position-sensor-carrying member is moveable relative to the function-button-carrying member between a first position, wherein the ball is located beneath the face of the function-button-carrying member and the ball is oriented to frictionally engage a surface under the input device and to detect relative motion between the input device and the surface under the input device so that the input device is usable as a mouse, and a second position, wherein the position-sensor-carrying member is displaced relative to the function-button-carrying member and the ball is oriented to detect relative motion between the ball and a user's hand so that the ball can be manually rotated to permit the input device to be used as a trackball, and wherein, when the position-sensor-carrying member is in its second position, the position-sensor-carrying member is horizontally slidable relative to the function-button-carrying member, wherein the position-sensor-carrying member can be displaced horizontally to a protected position wherein the ball is substantially enclosed between the function-button-carrying member and the position-sensor-carrying member.

8. A computer input device according to claim 7 wherein a dimension of a hand-grippable portion of the input device is adjustable by moving the position-sensor-carrying member relative to the function-button-carrying member, thereby adapting the computer input device for use by hands of different sizes.

9. A computer input device according to claim 7 wherein, when the position-sensor-carrying member is in a second configuration relative to the function-button-carrying member, an upper surface of the ball is exposed and the input device is usable as a trackball and a distance between the function button and the ball can be varied by moving the position-sensor-carrying member relative to the function-button-carrying member to accommodate hands of different sizes.

10. The input device of claim 7 wherein the position-sensor-carrying member is connected to the function-button-carrying member by a pair of opposed pins which engage a pair of elongated grooves.

11. The input device of claim 10 wherein the pins are on the function-button-carrying member and the grooves are on the position-sensor-carrying member.

12. The input device of claim 10 wherein the pins are on the position-sensor-carrying member and the grooves are on the function-button-carrying member.

13. A computer input device according to claim 7, wherein the housing member comprises a curved upper surface upon which a user may rest their hand while operating the device.

14. A computer input device selectively operable as a mouse or as a trackball, the input device comprising:
- a function-button-carrying member;
- at least one function button on a face of the function-button-carrying member;
- a position-sensor-carrying member coupled to the function-button-carrying member, the position-sensor-carrying member comprising a first part pivotally connected to the function-button-carrying member for rotation about a generally vertical axis and a second part pivotally connected to the first part, the second part rotatable relative to the first part about an axis which is generally perpendicular to the generally vertical axis; and,
- a position sensor on the position-sensor-carrying member, the position sensor comprising a ball supported for rotation on the position-sensor-carrying member and a sensor associated with the ball, the sensor adapted to generate a signal describing rotation of the ball;

wherein the position-sensor-carrying member is moveable relative to the function-button-carrying member between a first position, wherein the ball is located beneath the face of the function-button-carrying member and the ball is oriented to frictionally engage a surface under the input device and to detect relative motion between the input device and the surface under the input device so that the input device is usable as a mouse, and a second position, wherein the position-sensor-carrying member is displaced relative to the function-button-carrying member and the ball is oriented to detect relative motion between the ball and a user's hand so that the ball can be manually rotated to permit the input device to be used as a trackball.

15. A computer input device selectively operable as a mouse or as a trackball, the input device comprising:
   a function-button-carrying member;
   at least one function button on a face of the function-button-carrying member;
   a position-sensor-carrying member coupled to the function-button-carrying member and detachably receivable within the function-button-carrying member; and,
   a position sensor on the position-sensor-carrying member; wherein the position-sensor-carrying member is moveable relative to the function-button-carrying member between a first position, wherein the position sensor is located beneath the face of the function-button-carrying member and the position sensor is oriented to detect relative motion between the input device and the surface beneath the input device so that the input device is usable as a mouse, and a second position, wherein the position-sensor-carrying member is displaced relative to the function-button-carrying member and the position sensor is oriented to detect relative motion between the position sensor and a user's hand.

16. A computer input device selectively operable as a mouse or as a trackball, the input device comprising:
   a function-button-carrying member;
   at least one function button on a face of the function-button-carrying member;
   a position-sensor-carrying member coupled to the function-button-carrying member and; and,
   a position sensor on the position-sensor-carrying member; wherein the position-sensor-carrying member is moveable relative to the function-button-carrying member between a first position, wherein the position sensor is located beneath the face of the function-button-carrying member and the position sensor is oriented to detect relative motion between the input device and a surface beneath the input device so that the input device is usable as a mouse, and a second position, wherein the position-sensor-carrying member is displaced relative to the function-button-carrying member and the position sensor is oriented to detect relative motion between the position sensor and a user's hand and wherein the position-sensor-carrying member is detachable from the function-button-carrying member, the device comprising a path for transmitting signals from the function button to the host computer when the position-sensor-carrying member is detached from the function-button-carrying member.

17. A computer input device comprising:
   a function-button-carrying member;
   at least one function button on a face of the function-button-carrying member;
   a position-sensor-carrying member detachably coupled to the function-button-carrying member; and,
   a position sensor on the position-sensor-carrying member; wherein the position-sensor-carrying member may be coupled to the function-button-carrying member in a first position in which the position sensor is positioned beneath the function-button-carrying member where it can detect motion of the input device relative to a surface beneath the input device to permit the input device to be used as a mouse, and when the position-sensor-carrying member is separated from the function-button-carrying member the position-sensor-carrying member can be separated from the function-button-carrying member to permit two-handed operation of the input device.

18. The computer input device of claim 17 wherein the position sensor comprises a rotatable ball and the ball is frictionally engageable with a surface beneath the input device when the position-sensor-carrying member is in its first position.

19. A computer input device comprising:
   a housing member;
   a position-sensor-carrying member;
   a position sensor on the position-sensor-carrying member; and,
   at least one function button on the input device; the position-sensor-carrying member coupled to the housing member and movable relative to the housing member and the function button between:
      a first position, wherein the housing member extends over the position sensor and the position sensor is disposed to detect relative motion between the input device and a surface beneath the input device so that the input device is operable as a mouse, and
      a second position, wherein the position sensor is displaced transversely relative to the housing member;
   wherein the position sensor comprises a ball supported for rotation on the position-sensor-carrying member and a sensor connected to generate a signal describing rotation of the ball;
   wherein, when the position-sensor-carrying member is in the first position, the ball may frictionally engage and rotate against the surface beneath the input device, and when the position-sensor-carrying member is in the second position, the ball may be rotated by one or more digits of a user's hand;
   wherein the position-sensor-carrying member is pivotally coupled to the housing member, such that the position-sensor-carrying member is moveable relative to the housing member by rotation about a pivot axis; and
   wherein the input device comprises a switch, the switch switching from a first state to a second state when the position-sensor-carrying member is moved from the first position to the second position.

20. The input device of claim 19, wherein the position-sensor-carrying member is slidably coupled to the housing member.

21. The input device of claim 19, wherein the position-sensor-carrying member is pivotally coupled to the housing member.

22. A computer input device comprising:
   a housing member;
   a position-sensor-carrying member;
   a position sensor on the position-sensor-carrying member; and, at least one function button on the input device;
   the position-sensor-carrying member coupled to the housing member and movable relative to the housing member and the function button between:
      a first position, wherein the housing member extends over the position sensor and the position sensor is disposed to detect relative motion between the input device and a surface beneath the input device so that the input device is operable as a mouse, and
      a second position, wherein the position sensor is displaced transversely relative to the housing member;
   wherein the position sensor comprises a ball supported for rotation on the position-sensor-carrying member and a sensor connected to generate a signal describing rotation of the ball;

wherein, when the position-sensor-carrying member is in the first position, the ball may frictionally engage and rotate against the surface beneath the input device, and when the position-sensor-carrying member is in the second position, the ball may be rotated by one or more digits of a user's hand;

wherein the position-sensor-carrying member is pivotally coupled to the housing member, such that the position-sensor-carrying member is moveable relative to the housing member by rotation about a pivot axis; wherein the pivot axis is generally vertical.

23. The input device of claim 22, wherein a first portion of the position-sensor-carrying member is rotatable about a generally horizontal axis relative to a second portion of the position-sensor-carrying member.

24. The input device of claim 22, wherein the position-sensor-carrying member is horizontally slidable relative to the housing member and the position-sensor-carrying member is movable to a storage position, wherein the ball is enclosed between the position-sensor-carrying member and the housing member.

25. The input device of claim 24, wherein the position-sensor-carrying member is connected to the housing member by a pair of opposed pins which engage a pair of elongated grooves.

26. A computer input device comprising:

a housing member;

a position-sensor-carrying member;

a position sensor on the position-sensor-carrying member; and, at least one function button on the input device;

the position-sensor-carrying member coupled to the housing member and movable relative to the housing member and the function button between:

a first position, wherein the housing member extends over the position sensor and the position sensor is disposed to detect relative motion between the input device and a surface beneath the input device so that the input device is operable as a mouse, and a second position, wherein the position sensor is displaced transversely relative to the housing member;

wherein the position-sensor-carrying member is detachably receivable within the housing member.

27. A computer input device comprising:

a housing member;

a position-sensor-carrying member;

a position sensor on the position-sensor-carrying member; and, at least one function button on the input device;

the position-sensor-carrying member coupled to the housing member and movable relative to the housing member and the function button between:

a first position, wherein the housing member extends over the position sensor and the position sensor is disposed to detect relative motion between the input device and a surface beneath the input device so that the input device is operable as a mouse, and a second position, wherein the position sensor is displaced transversely relative to the housing member;

wherein the position-sensor-carrying member is detachable from the housing member, the device comprising a path for transmitting signals from the position sensor to a host computer and a path for transmitting signals from the function button to the host computer when the position-sensor-carrying member is detached from the housing member.

28. A computer input device comprising:

a housing member;

at least one function button on a face of the housing member a position-sensor-carrying member comprising a position sensor, the position-sensor-carrying member detachably coupled to the housing member, such that the input device is operable both when the position-sensor-carrying member is coupled to the housing member in a first configuration and when the position-sensor-carrying member is separated from the housing member in a second configuration; and wherein, when the position-sensor-carrying member is in the first configuration, the position sensor is covered by the housing member and is located to detect motion of the input device relative to a surface beneath the input device.

29. The input device of claim 28, wherein the position sensor comprises a rotatable ball and a sensor connected to generate a signal describing rotation of the ball and, when the position-sensor-carrying member is in the first configuration, the ball is capable of frictionally engaging and rotating against the surface beneath the input device.

30. The input device of claim 29, wherein, when the position-sensor-carrying member is in the second configuration, the ball is exposed so that it may be manipulated by one or more digits of a user's hand.

* * * * *